US007243810B2

(12) United States Patent  
O'Brien et al.

(10) Patent No.: US 7,243,810 B2
(45) Date of Patent: Jul. 17, 2007

(54) INTERLOCKING VALVE BOX AND LID

(75) Inventors: Kevin G. O'Brien, Pasadena, CA (US); Gerald E. Peterson, Riverside, CA (US); James G. Coates, Sun Valley, CA (US); Beatrice John, Villa Park, CA (US); Barbara E. Booth, Glendale, CA (US); Mark M. Ensworth, Orange, CA (US)

(73) Assignee: Rain Bird Corporation, Azusa, CA (US)

( * ) Notice: Subject to any disclaimer, the term of this patent is extended or adjusted under 35 U.S.C. 154(b) by 305 days.

(21) Appl. No.: 10/715,919

(22) Filed: Nov. 17, 2003

(65) Prior Publication Data

US 2005/0103782 A1  May 19, 2005

(51) Int. Cl.
B65D 6/25 (2006.01)
B65D 17/28 (2006.01)
B65D 88/76 (2006.01)
H02G 3/18 (2006.01)

(52) U.S. Cl. .................... 220/484; 220/3.94; 220/4.24; 220/266; 220/661

(58) Field of Classification Search ................ 220/484, 220/3.94, 3.5, 4.24, 661, 3.92, 266, 4.02; 206/507
See application file for complete search history.

(56) References Cited

U.S. PATENT DOCUMENTS

| 2,999,611 | A |   | 9/1961 | Paulson |
| 3,251,460 | A | * | 5/1966 | Edmonds ................ 206/523 |
| 3,360,152 | A |   | 12/1967 | Leers |
| 3,620,403 | A |   | 11/1971 | Rump |
| 3,984,023 | A |   | 10/1976 | Hodas |
| 4,007,852 | A | * | 2/1977 | Gernhardt ................ 220/3.2 |
| 4,014,450 | A | * | 3/1977 | Girotti et al. ............. 220/4.24 |
| D245,102 | S |   | 7/1977 | Gross |
| 4,163,503 | A |   | 8/1979 | McKinnon |
| 4,195,746 | A | * | 4/1980 | Cottrell ................... 220/4.24 |
| 4,294,371 | A | * | 10/1981 | Davis ..................... 220/4.24 |
| 4,333,580 | A |   | 6/1982 | Sweigart, Jr. |
| 4,389,535 | A | * | 6/1983 | Slater et al. ............. 174/65 R |
| 4,676,392 | A | * | 6/1987 | Giggard et al. ........... 220/284 |
| 4,872,575 | A |   | 10/1989 | Kobilan |
| 4,925,045 | A |   | 5/1990 | Logsdon |
| 5,356,023 | A |   | 10/1994 | Krupa |
| 5,444,183 | A | * | 8/1995 | Gehrs et al. ............. 174/65 R |
| 6,029,803 | A | * | 2/2000 | Ovadia et al. ............ 206/6.1 |
| 6,079,439 | A |   | 6/2000 | Hartley |
| 6,250,406 | B1 |   | 6/2001 | Luke |
| 6,264,056 | B1 |   | 7/2001 | King |
| 6,362,419 | B1 |   | 3/2002 | Gallagher et al. |
| 6,460,563 | B2 |   | 10/2002 | Olson et al. |
| 6,806,426 | B1 | * | 10/2004 | Gretz ....................... 174/67 |

* cited by examiner

Primary Examiner—Anthony D. Stashick
Assistant Examiner—Niki M. Eloshway
(74) Attorney, Agent, or Firm—Fitch, Even, Tabin & Flannery

(57) ABSTRACT

An improved underground box and lid for use in irrigation systems and other underground systems is provided. A single box can be inverted, combined and interlocked with a second box to form a single enclosed structure that is twice as high. This can be used for those installations where underground system components are buried in the ground at a greater depth than can be accommodated by a single box.

7 Claims, 16 Drawing Sheets

INTERLOCKING VALVE BOX AND LID

FIELD OF THE INVENTION

The present invention relates to a protective housing structure and lid for underground devices such as meters, control valves, etc.

BACKGROUND

Valve boxes or other underground protective housings have been in use for some time in protecting pumps, valves, meters and other components of underground systems. These enclosures often have open bottoms so that they can be positioned over the underground component with the top of the housing being flush or slightly above or below the ground level. While older underground housings were constructed of concrete, more recent housings have been manufactured from metal or plastic. Often, the more recent housings are constructed of plastic that has been formed by a molding process.

A lid covers the top of the housing thereby keeping out dirt and debris while permitting access to the system components. Lids for underground irrigation system boxes typically have a hole through which a bolt can be inserted. The bolt can engage a threaded bore in the underground housing to keep the lid secured on the housing. However many users believe that the lids remain sufficiently secure on their underground boxes without the use of any coupler or bolt, and accordingly do not insert anything in the hole for securing the lid. With the lid and box interior thus exposed, insects, especially bees, have been known to enter the interior cavity of the box and build insect nests. Moreover, debris and dirt likewise can enter the interior cavity through this hole when it is not used with and covered by a bolt.

When a user needs to gain access to the system components housed within the box, the box and lid are sometimes covered with dirt and debris that need to be removed with a shovel. When the dirt and debris are removed from the lid, the user frequently uses his or her hands to remove the lid, which often is a difficult task, or tries to use the shovel to pry the lid off of the box which in turn often chips or breaks the edges of the box.

Valve boxes are used in the irrigation industry in a number of ways. Users cut them into pieces, cut holes into them to facilitate piping, and then bury them in the ground with just the cover or lid showing. Some users stack two such boxes when a deeper burial depth is required. When two boxes are used in this fashion, however, they often are only mated together by the dirt that is packed around them. When mated in this fashion, one box can slide with respect to the other box thereby providing an opening between the boxes with the undesirable consequence of allowing dirt to enter the underground enclosure.

Valve boxes sometimes have knockouts to assist the user in removing one or more sections or pieces from the sides of the box when it is necessary to run wires or pipes through the sides. In order to make the knockouts sufficiently thin to be able to remove them with relative ease, manufacturers of valve boxes using molding processes must design the entire box with thick enough walls to permit material, such as plastic, to flow into, or fill all of the cavities of a molded part, including the knockout portions. Also the manufacturer must design the molding tool so that the molded product can eject from the tool either by falling out under the force of gravity or by forceful ejection with pins.

In order to overcome these manufacturing challenges, prior art molded boxes sometimes include "fake" knockouts, i.e., features that look like knockouts and indicate a recommended place to remove material. However these frequently are not actually thin enough to be removed with relative ease. Other known designs involve valve boxes with knockouts created with advanced molding tools (sometimes using cams or slides) or with secondary machining operations, either of which option can add to manufacturing costs and difficulties.

Once users create a hole in a valve box through which to route a conduit, there often is a gap between the conduit and the opening in the box that allows dirt to fall in the interior cavity when the area around the box is backfilled. In the past, some users have tried to avoid this problem by locating most anything that is readily available, including cardboard, duct tape, or even empty soda cans, to place over this gap and attempt to cover it before filling the dirt in around the box. However, this can be inconvenient for the user, and it sometimes is ineffective in adequately covering the gap.

Accordingly, there remains a need for an improved underground protective housing which may receive and house various underground system components, such as valves, meters, electric junction boxes, etc. and which addresses some of the problems described above.

SUMMARY OF THE ILLUSTRATED EMBODIMENTS

An improved underground box and lid for use in irrigation systems and other underground systems is provided. A single box can be inverted, combined and interlocked with a second box to form a single enclosed structure that is twice as high. This can be used for those installations where underground system components are buried in the ground at a greater depth than can be accommodated by a single box.

The interlock is accomplished by a series of ridges extending axially from the edge surface of the box. One ridge extends around about one fourth of the box's perimeter and is offset to the inside. This is followed by a second ridge that extends around approximately another one fourth of the box's perimeter and is offset to the outside. This pattern is repeated for third and fourth ridges. These ridges form channels, in symmetrical, multiple sections, that interlock the boxes together and inhibit them from sliding off of one another during backfilling operations.

Thus there is disclosed a first housing for installation in the ground and for mating with a second housing for installation in the ground. In one embodiment, the second housing is generally identical in construction to the first housing. The second housing defines a second housing opening and has a second housing edge surface surrounding the second housing opening. The second housing further has at least two second housing ridges, each of which extends axially from the second housing edge surface.

The first housing comprises at least one wall forming an interior cavity and forming a first generally rectangular-shaped opening into the interior cavity. The at least one wall has an outer surface, an inner surface and a first housing edge surface connecting the inner and outer surfaces and surrounding the first opening. An inner first housing ridge extends axially from the first housing edge surface and surrounds a first portion of the first opening. An outer first housing ridge extends axially from the first housing edge surface and surrounds a second portion of the first opening. The inner first housing ridge is disposed in a closer proximity to the first opening than the outer first housing ridge.

The inner and outer first housing ridges are adapted to mate with the at least two second housing ridges thereby inhibiting relative slidable movement between the first and second housings.

In an alternative embodiment, the second housing further has at least an additional two second housing ridges extending axially from the second housing edge surface. The first housing further has a second inner first housing ridge and a second outer first housing ridge, each of which extends axially from the first housing edge surface and surrounds third and fourth portions, respectively, of the first opening. The second inner first housing ridge is disposed in a closer proximity to the first opening than the second outer first housing ridge. The second inner and outer first housing ridges are adapted to mate with the at least additional two second housing ridges thereby inhibiting relative slidable movement between the first and second housings.

The improved box further includes a plurality of knockouts, each of which includes a central rib or extension that runs from the interior box wall down the center of the knockout piece. According to one embodiment of the invention, the knockout is connected to the wall by only the extension and by two other connection points at the opposite end of the knockout piece. Thus the user can bend the knockout inward and break it off of the wall completely at the third connection point, i.e., the extension.

Thus there is disclosed a housing that is comprised of at least one wall forming an interior cavity and forming a first opening into the interior cavity. The at least one wall has a wall portion constructed of a material having a first thickness. A plurality of knockouts is formed in the at least one wall, each of which has an inner face and an outer face, and is constructed of a material having a second thickness that is less than the first thickness. Each of the knockouts further has a proximate end and a distal end, and is frangibly connected to the at least one wall at the distal end of the knockout. An extension extends from the wall portion onto either the inner or outer face of the proximate end of each knockout. Each extension is constructed of a material having a thickness that is substantially the same as the first thickness of the wall portion. Each extension is adapted to connect one of the knockouts to the at least one wall and to be broken. This permits removal of one of the knockouts from the at least one wall and provides an additional opening into the interior cavity.

In one aspect, each knockout has a proximate end and a distal end wherein the extension extends from the at least one wall onto the proximate end of the knockout thereby providing a first knockout connection location. The knockout is further connected to the at least one wall at a plurality of additional connection locations at the distal end of the knockout. The only connection locations between the knockout and the at least one wall are the knockout connection location and the plurality of additional connection locations.

In another embodiment, a housing comprises at least one wall forming an interior cavity. A first knockout is formed in the at least one wall and adapted for removal from the at least one wall thereby forming a first opening into the interior cavity. A first wall coupler is disposed on the at least one wall. A first knockout coupler is disposed on the first knockout and adapted to connect the first knockout to the first wall coupler so that the first knockout at least partially covers the first opening. This can reduce the amount of dirt that may enter the hole and the interior cavity during backfilling.

In one aspect, the first wall coupler is comprised of a pair of wall ribs disposed adjacent to the first opening and the first knockout coupler is comprised of a knockout rib adapted to mate with the pair of wall ribs.

In another aspect, a housing comprises at least one wall forming an interior cavity and forming an upper opening into the interior cavity and a lower opening into the interior cavity. The upper and lower openings have an upper opening perimeter and a lower opening perimeter, respectively. The at least one wall is slanted so that the upper opening perimeter is smaller than the lower opening perimeter. A knockout is formed in the at least one wall and adapted for removal from the at least one wall thereby forming a knockout opening into the interior cavity. A plurality of vertically oriented wall ribs are disposed on the outer surface of the at least one wall. At least one knockout rib is disposed on the knockout and adapted to connect the knockout to the plurality of wall ribs so that the knockout at least partially covers the knockout opening.

In yet another embodiment, the housing further has a ledge located at the top of the housing, just below its lid. This allows the lid to be removed with the use of a shovel or other tool or lever while minimizing the risk of damage to the housing. The ledge guides the tip of the shovel under the lid so that the lid can be lifted open without having to dig out the dirt and debris from around the box by hand.

Thus there is disclosed a housing for installation in the ground and for use with a lid and a lever. The housing comprises at least one wall forming an interior cavity and forming an opening into the interior cavity. The at least one wall has an outer surface, an inner surface and a housing edge surface connecting the inner and outer surfaces. The housing edge surface surrounds the opening and is adapted to support the lid so that the lid substantially covers the opening. A fulcrum is disposed adjacent to the edge surface on the at least one wall and is adapted to support the lever for use in lifting the lid off of the housing edge surface.

In one aspect, the lid has a first lid portion and a second lid portion. The fulcrum is a ledge and the housing edge surface is adapted to support the lid so that the first lid portion overhangs the ledge. The ledge is adapted to permit the insertion of the lever between the first lid portion and the ledge when the lid is supported by the housing edge surface.

In another aspect, the lever is a shovel having a handle and a blade with a generally curve-shaped cross-section. The ledge is curve-shaped and adapted to register with the blade.

In another embodiment, the housing edge surface has a recessed portion that defines a gap between the lid and the recessed portion when the lid is supported by the edge surface. The gap is adapted to permit the insertion of a lever between the lid and the recessed portion of the edge surface for use in lifting the lid off of the housing edge surface.

In yet another embodiment, a lid knockout is provided in order to inhibit the entry of dirt or insects into the housing cavity. The housing has a housing coupler adapted to engage a lid coupler. The housing further has at least one wall forming the interior cavity which, in turn, is adapted for enclosing an underground irrigation valve. The at least one wall further forms a first opening into the interior cavity and has a housing edge surface surrounding the first opening.

The lid comprises a generally planar-shaped member having an exterior side and an interior side. The interior side is adapted to abut the housing edge surface so that the housing edge surface supports the member and so that the member substantially covers the first opening. The knockout is formed in the generally planar-shaped member and adapted for removal from the member thereby providing a lid opening. The lid opening is adapted to permit either the lid coupler or the housing coupler to extend through the lid opening and to engage with the other of the lid coupler and the housing coupler thereby securing the generally planar-shaped member to the housing.

In one aspect, the generally planar-shaped member has a first member portion constructed of a material having a first thickness and a second member portion constructed of a material having a second thickness that is less than the first thickness. The knockout is substantially surrounded by the first member portion, and the second member portion is adapted to connect the knockout to the first member portion.

In another aspect, the lid coupler is a bolt and the housing coupler is comprised of a bracket extending into the interior cavity from the at least one wall and having an internally-threaded bore adapted to mate with the bolt thereby securing the generally planar-shaped member to the housing.

There are additional aspects to the present inventions. It should therefore be understood that the preceding is merely a brief summary of some of their embodiments and aspects. Additional embodiments and aspects of the present inventions are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

DETAILED DESCRIPTION OF THE PREFERRED EMBODIMENTS

In the following description, reference is made to the accompanying drawings which illustrate, by way of example only, several embodiments of the present invention. It is understood that other embodiments may be utilized and structural and operational changes may be made without departing from the scope of the present invention.

An improved underground box and lid for use in irrigation systems and other underground systems is provided. A single box can be inverted, combined and interlocked with a second box to form a single completely enclosed structure that is twice as high. This can be used when underground system components are buried at a greater depth in the ground than can be accommodated by a single box.

The interlock is accomplished by a series of ridges extending axially from the edge surface of the box. One ridge extends around about one fourth of the box's perimeter and is offset to the inside. This is followed by a second ridge that extends around approximately another one fourth of the box's perimeter and is offset to the outside. This pattern is repeated for third and fourth ridges. These ridges form channels, in symmetrical, multiple sections, that interlock the boxes together and inhibit them from sliding off of one another during backfilling operations. Because this provides a complementary pattern of channels and ridges, only one box design is required to permit two of these boxes to be stacked and interlocked. In addition to being convenient for the user, the manufacturer can realize savings by only using tooling for a single design.

Figure 1:
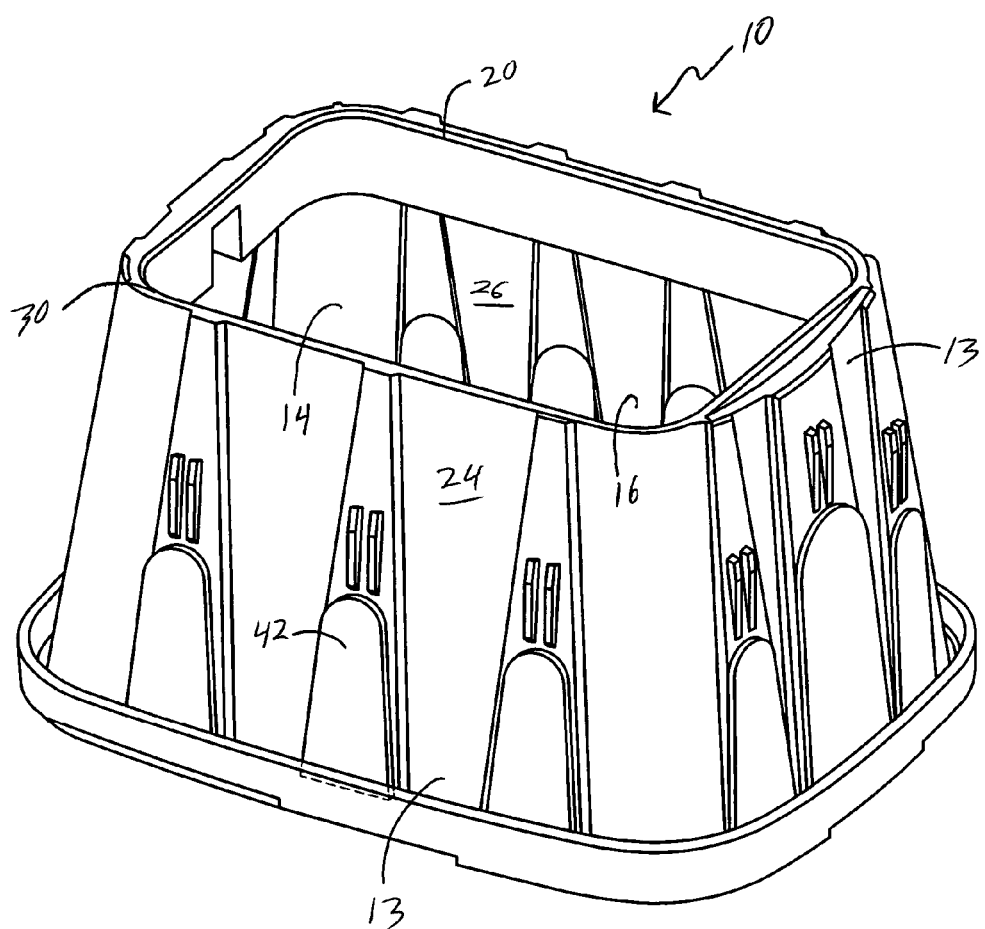
FIG. 1 is a perspective view of a valve box in accordance with one embodiment of the invention.
Figure 2:
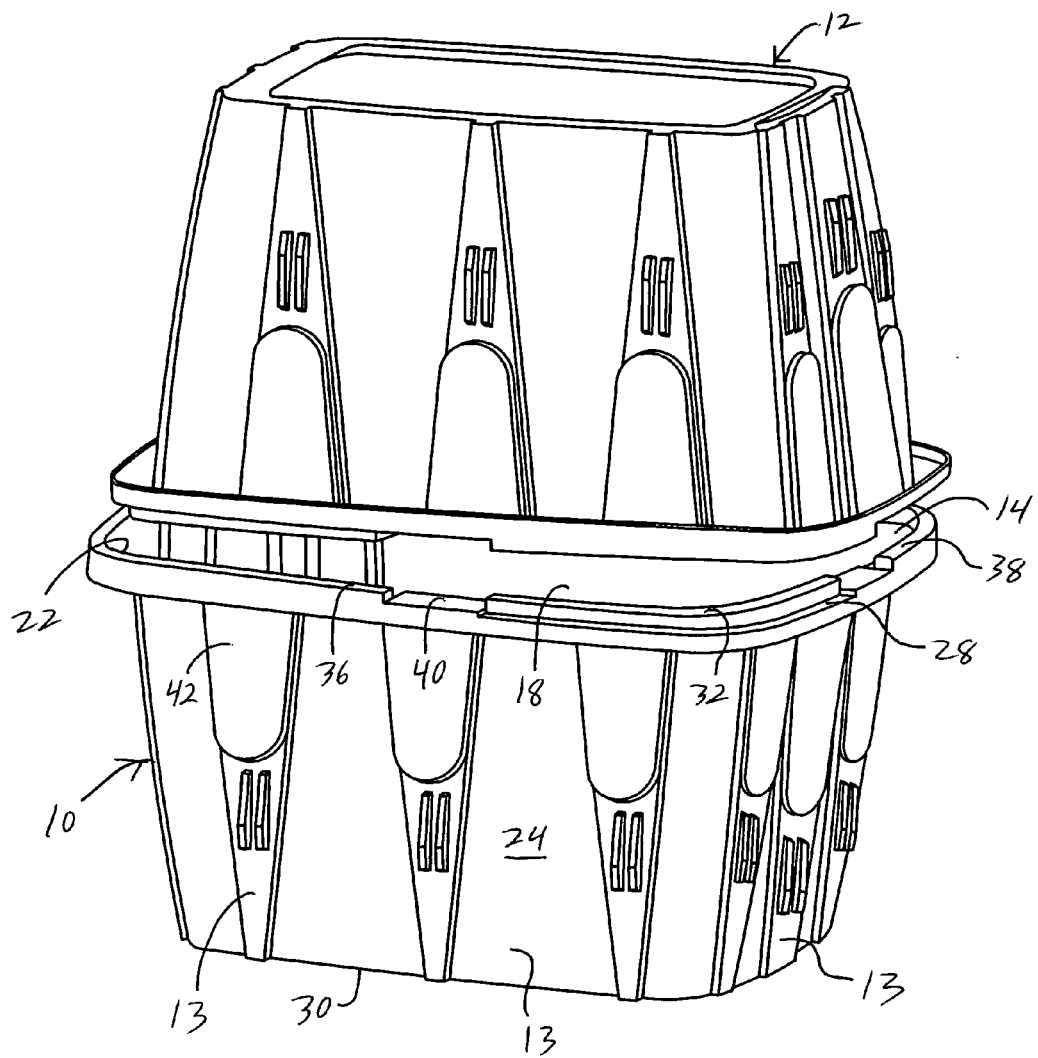
FIG. 2 is a perspective view of two valve boxes, one inverted with respect to the other, and each one of which is in accordance with the embodiment of FIG. 1.
Figure 3:
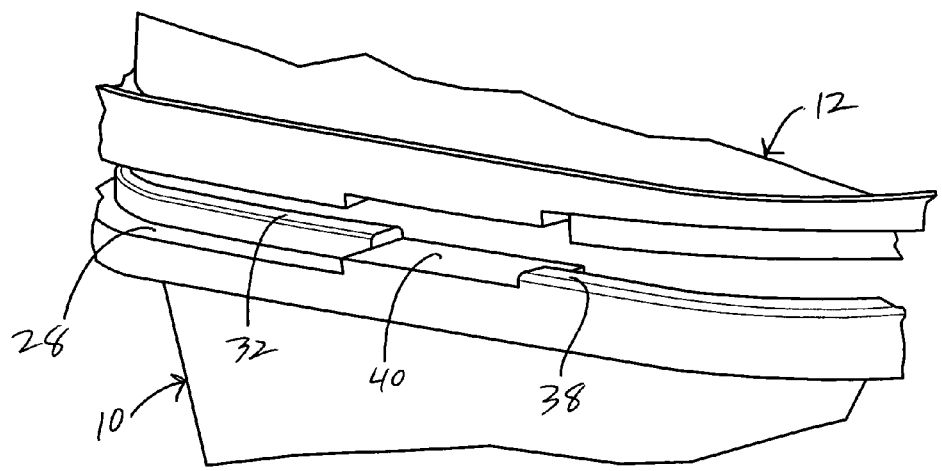
FIG. 3 is an enlarged perspective view of a portion of the valve boxes of FIG. 2 illustrating their mating relationship.
Figure 4:
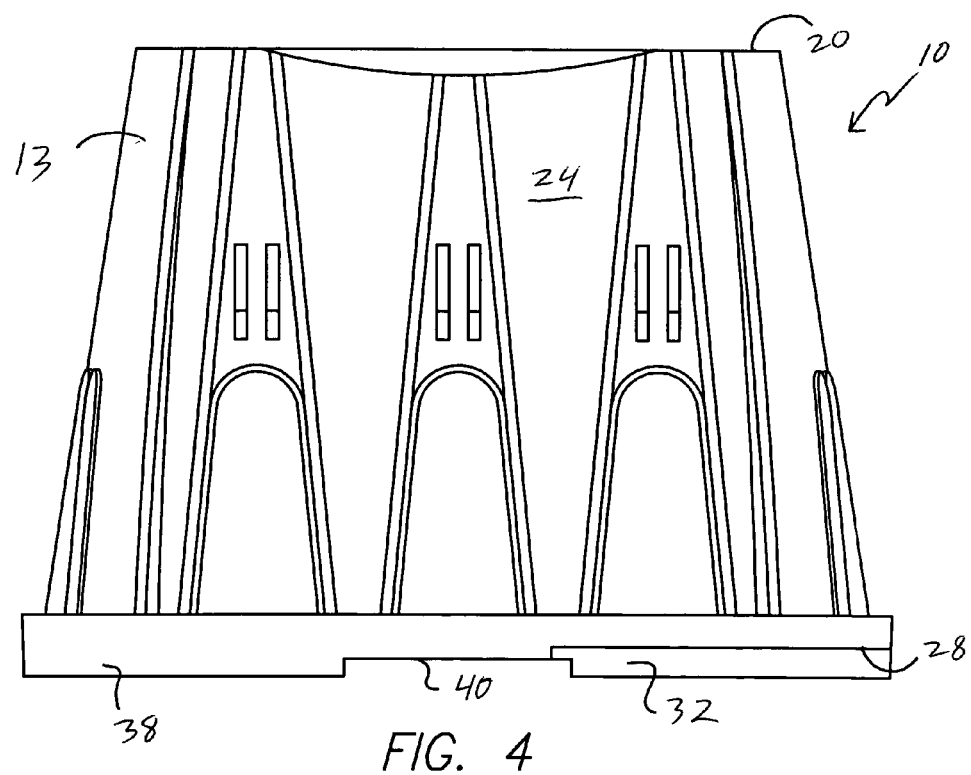
FIG. 4 is a front elevation view of the valve box of FIG. 1.
Figure 5:
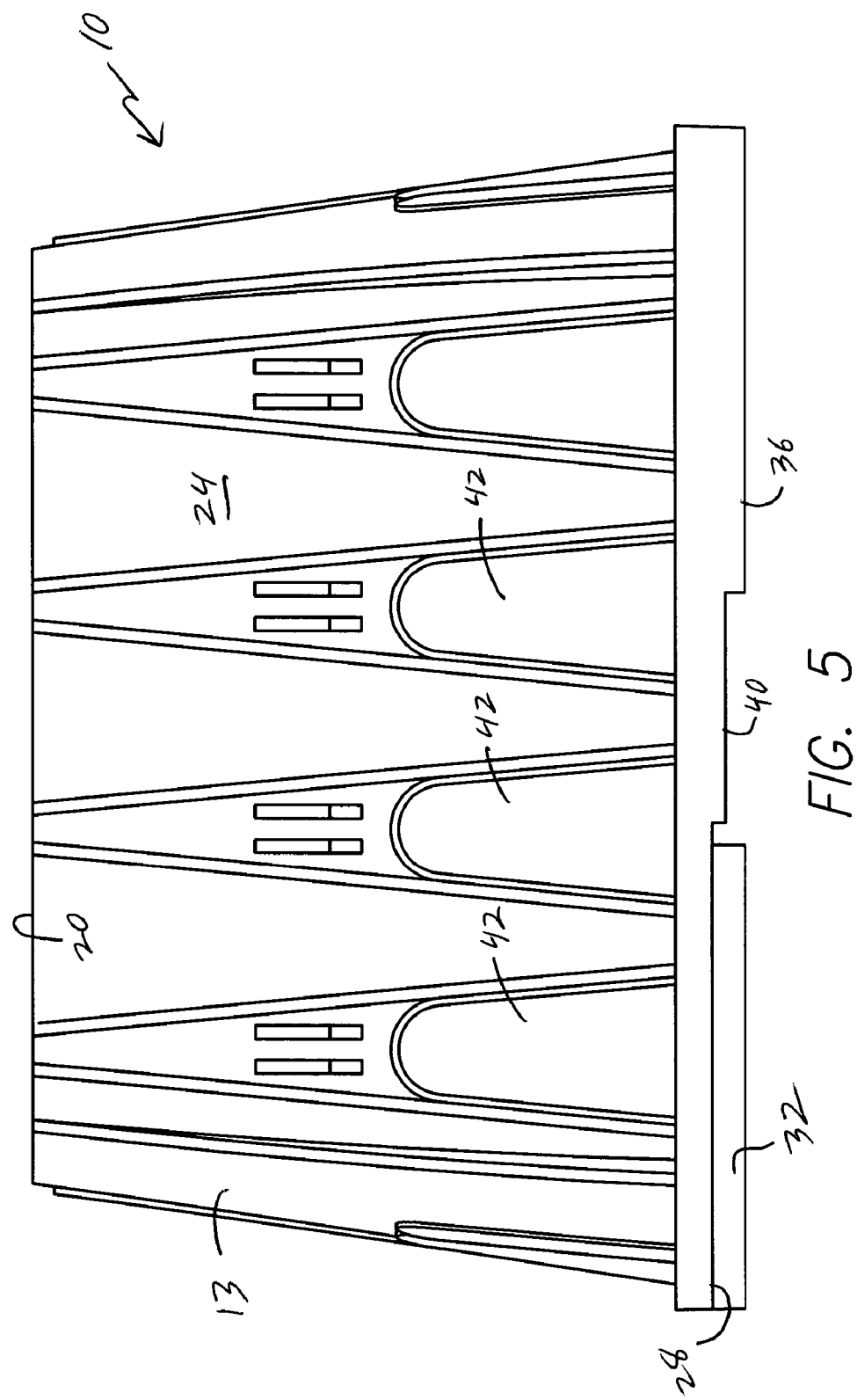
FIG. 5 is a side elevation view of the valve box of FIG. 1.

Referring to FIGS. 1 and 2, a housing 10 for installation in the ground and for mating with another housing 12 having generally the same construction as the first housing is shown. The housing 10 has a plurality of walls 13 forming an interior cavity 14, a generally rectangular-shaped upper opening 16 leading into the interior cavity 14, and a generally rectangular-shaped lower opening 18 leading into the interior cavity 14. The upper opening 16 has an upper opening perimeter 20 and the lower opening 18 has a lower opening perimeter 22. The housing walls 13 are slanted inward so that the upper opening perimeter 20 is smaller than the lower opening perimeter 22. Each of the walls 13 has an outer surface 24, an inner surface 26 and a lower housing edge surface 28 that connects the inner and outer surfaces and when combined with the other lower housing edge surfaces, surrounds the lower opening 18. Similarly, each of the walls 13 has an upper housing edge surface 30 that connects the inner and outer wall surfaces 24, 26, and when combined with the other upper edge surfaces 30, surrounds the upper opening 16.

Referring now to FIGS. 3–6, two inner housing ridges 32, 34 and two outer housing ridges 36, 38 extend axially from the lower housing edge surface 28. The inner and outer ridges are of the same height and each surrounds approximately one fourth of the perimeter 22 of the lower opening 18. The inner housing ridges 32, 34 are disposed in a closer proximity to the lower opening 18 than the outer housing ridges 36, 38. Four secondary ridges 40 separate the inner and outer housing ridges and form a gap between them. These secondary ridges 40, which do not extend as high as the inner and outer ridges 32, 34, 36, 38, are only a result of the manufacturing process of the illustrated embodiment and are not necessary for interlocking the two housings 10, 12.

Figure 6:
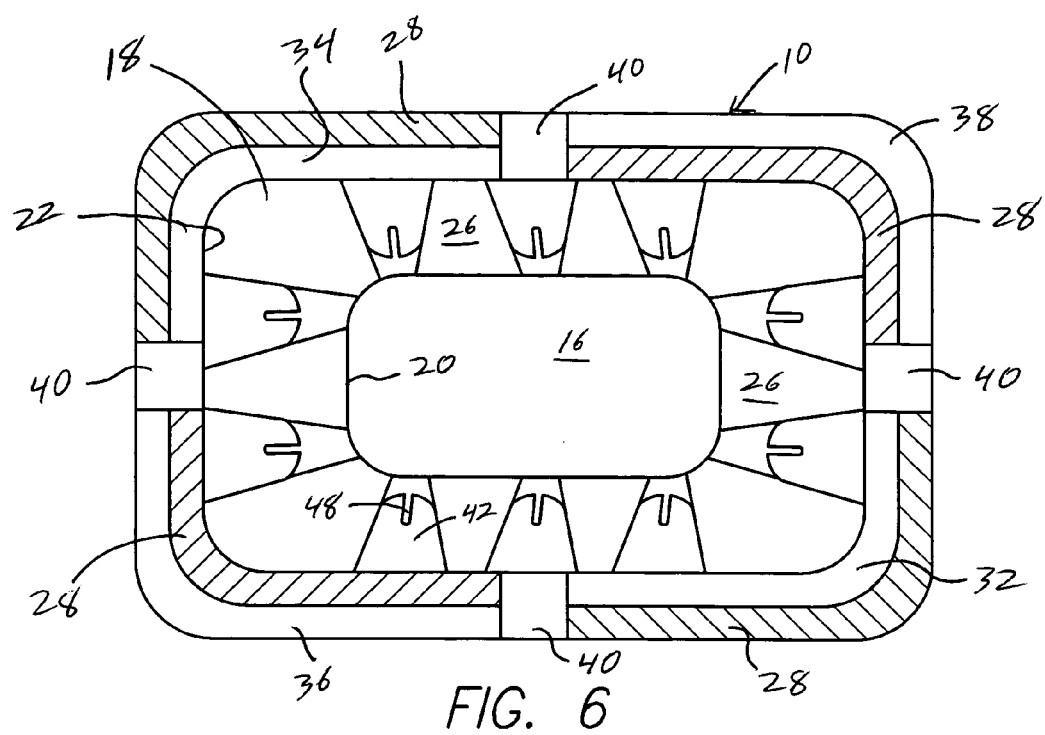
FIG. 6 is a bottom plan view of a valve box in accordance with the invention.

As best seen in FIG. 6, when viewed from the bottom, the inner and outer ridges 32, 34, 36, 38 of the housing 10 form a pattern that is generally the same as the pattern of ridges formed on the other housing 12. Thus the inner and outer housing ridges 32, 34, 36, 38 of the first housing 10 can mate with the ridges on the other housing 12 thereby inhibiting relative slidable movement between the two housings. This in turn reduces the likelihood of additional gaps or openings being formed between the two housings thus reducing the amount of dirt that may enter the interior cavity 14.

While the embodiment of FIGS. 2–6 shows a total of four ridges extending from the lower housing edge surface 28, alternative embodiments may employ a greater or lesser number of ridges. For example, two ridges comprising only one inner and one outer ridge may be used on each housing. Each such ridge can surround approximately one half of the perimeter of the opening. Nevertheless, this arrangement can mate with a second housing having a similar pattern of ridges thereby inhibiting any relative slidable movement between the two housings in any direction.

The improved box further includes a plurality of knockouts, each of which includes a central rib or extension that runs from the interior box wall down the center of the knockout piece. During the molding manufacturing process this extension is sometimes referred to as a "flow runner" and allows the plastic or other material forming the relatively thin knockout portion of the wall to flow and fill the mold properly. The knockout is connected to the wall only by the extension and two other connection points at the opposite end of the knockout piece. Thus the user can bend the knockout inward and break it off of the wall completely at the third connection point, i.e., the extension. The box that includes this knockout does not require advanced molding tools or operations to manufacture, fills adequately during the molding process despite the relatively thin knockout and allows for removal of the knockout by the end-user with relative ease.

Figure 7:
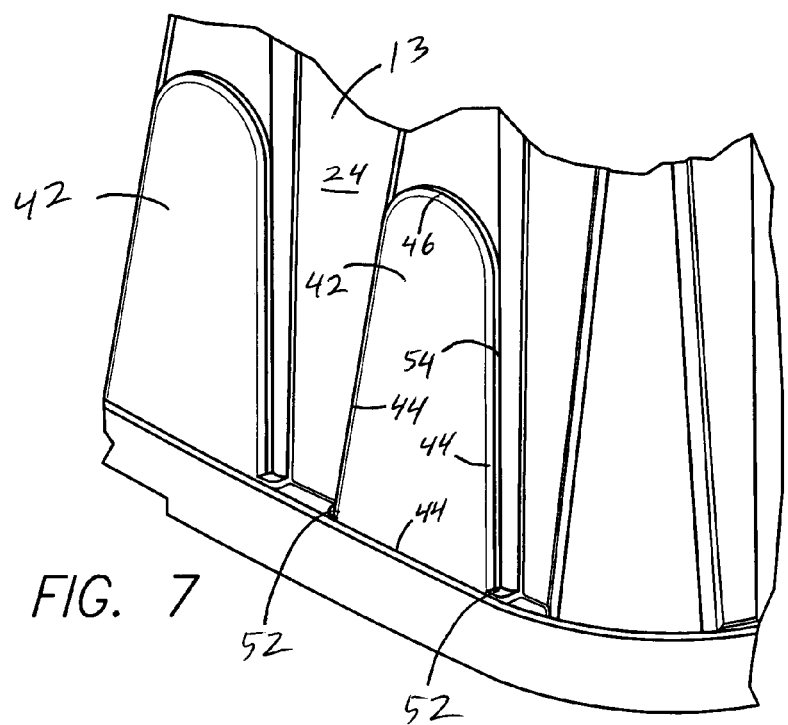
FIG. 7 is an enlarged perspective view of a portion of the valve box of FIG. 1 showing two knockouts.
Figure 8:
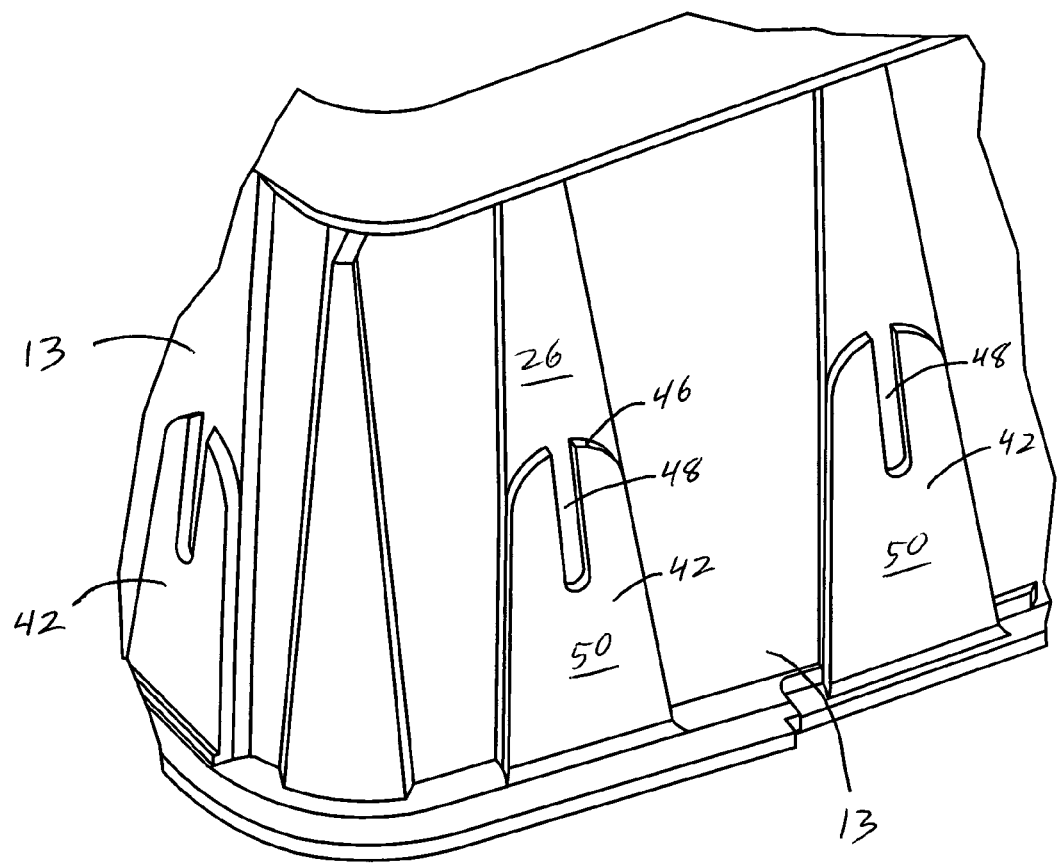
FIG. 8 is an enlarged perspective view of a portion of the interior of the valve box of FIG. 1 showing three knockouts.
Figure 9:
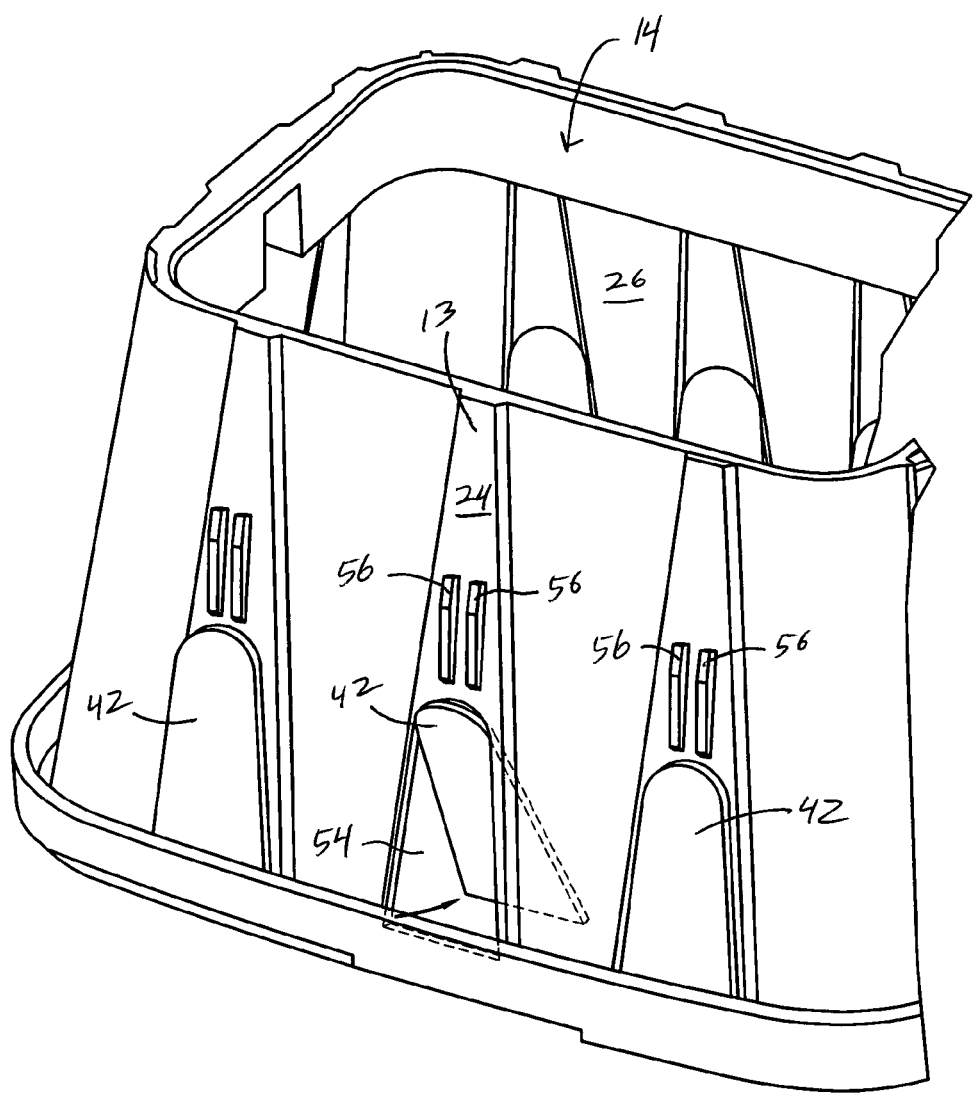
FIG. 9 is a perspective side view of a portion of the valve box of FIG. 1 showing a partially removed knockout.

Referring now to FIGS. 7–9, a plurality of knockouts 42 is formed in the housing walls 13. Each knockout 42 has three generally rectilinear sides 44 and a generally curve-shaped side 46, and is constructed of a material having a thickness that is less than the portion of the wall surrounding the knockout. A knockout extension 48 or rib having a thickness that is about the same as the surrounding wall portion extends from the inner surface 26 of the housing wall 13 across the generally curve-shaped side 46 of the knockout 42 and onto an inner face 50 of one end of the knockout 42. The extension 48 provides a frangible connection between the knockout 42 and the housing wall 13.

The knockout 42 is further connected to the wall 13 at two frangible connection points 52 or locations at the opposite end of the knockout 42. Thus there are only three connection points between the knockout 42 and the housing wall 13 with a gap 54 formed between the knockout 42 and the wall 13 at all other places on the knockout perimeter thus permitting easier removal. As best seen in FIGS. 7 and 9, the two connection points 52 at the lower end of the knockout 42 are broken first by the user. The knockout 42 is then bent inward until the third connection point, i.e., the extension 48, breaks. When broken, the extension 48 and connection points 52 permit removal of the knockout 42 from the wall 13 thus providing an opening 54 into the interior cavity 14 through which an underground conduit or other component may pass. As discussed more fully below, the extension 48 can further serve as a coupler for attaching the knockout 42 to the outer surface 24 of the housing wall 13 after the knockout 42 is removed.

Once removed from the box wall by the user to create an access hole for a conduit or other underground system component, the knockout can be used to cover a portion of the hole in order to reduce the amount of dirt that may enter the hole during backfilling. The knockout extension is adapted to mate with a pair of vertically oriented wall ribs that are located on the wall of the box adjacent to and just above the opening that is formed by the removal of the knockout. Prior to backfilling, the knockout extension can be inserted between the pair of wall ribs and the knockout allowed to rest on top of the conduit or component that is running through the opening. This holds the knockout in place during backfilling.

Figure 10:
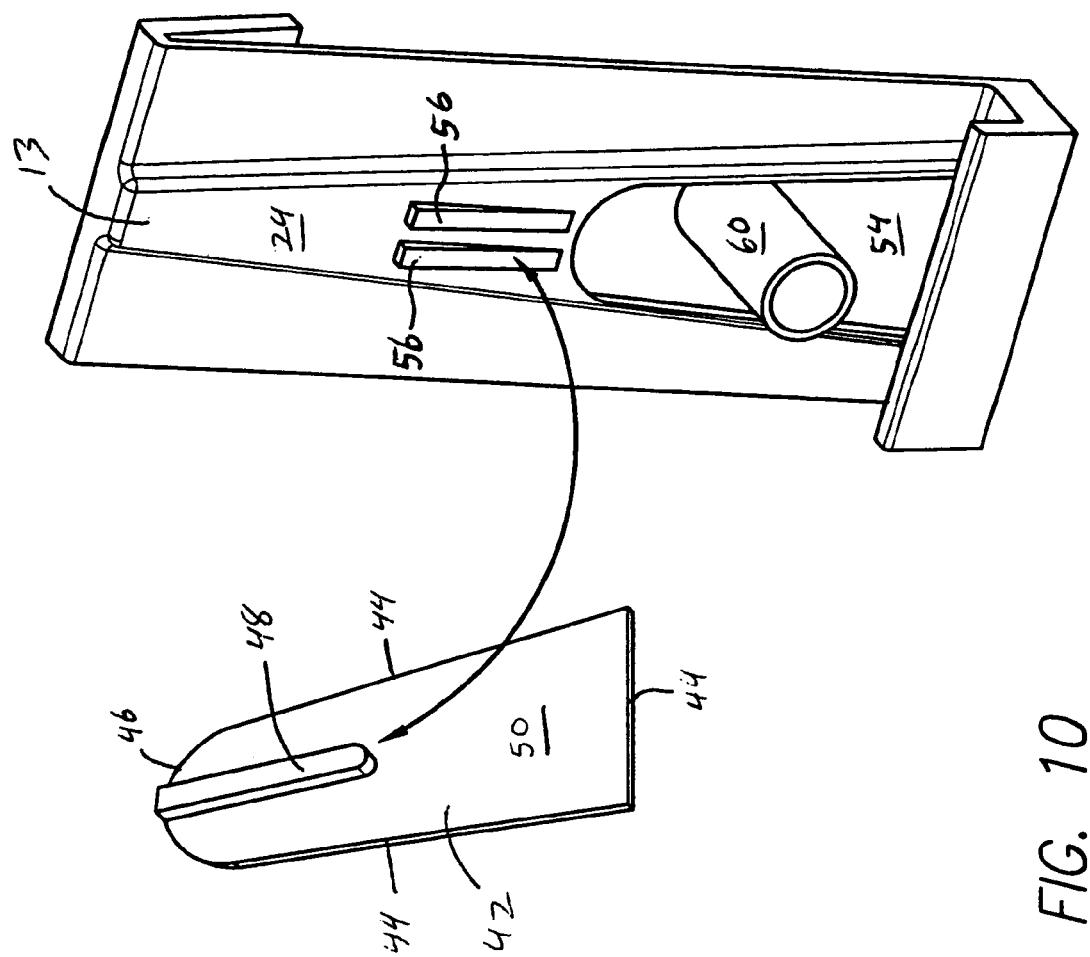
FIG. 10 is an enlarged perspective view of a portion of the valve box of FIG. 1 with the knockout removed and of a removed knockout.
Figure 11:
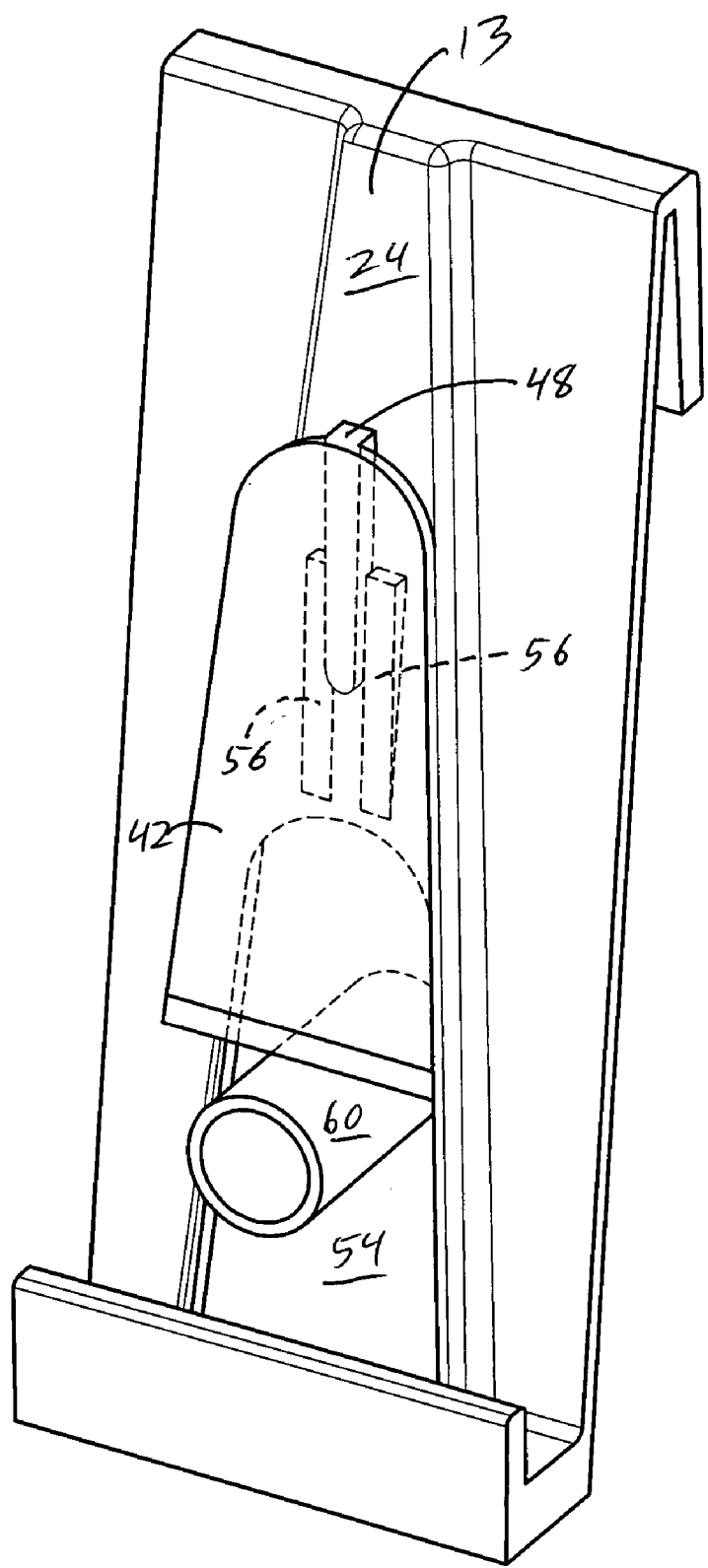
FIG. 11 is an enlarged perspective view of a portion of the valve box of FIG. 1 with a removed knockout partially covering a valve box opening.
Figure 12:
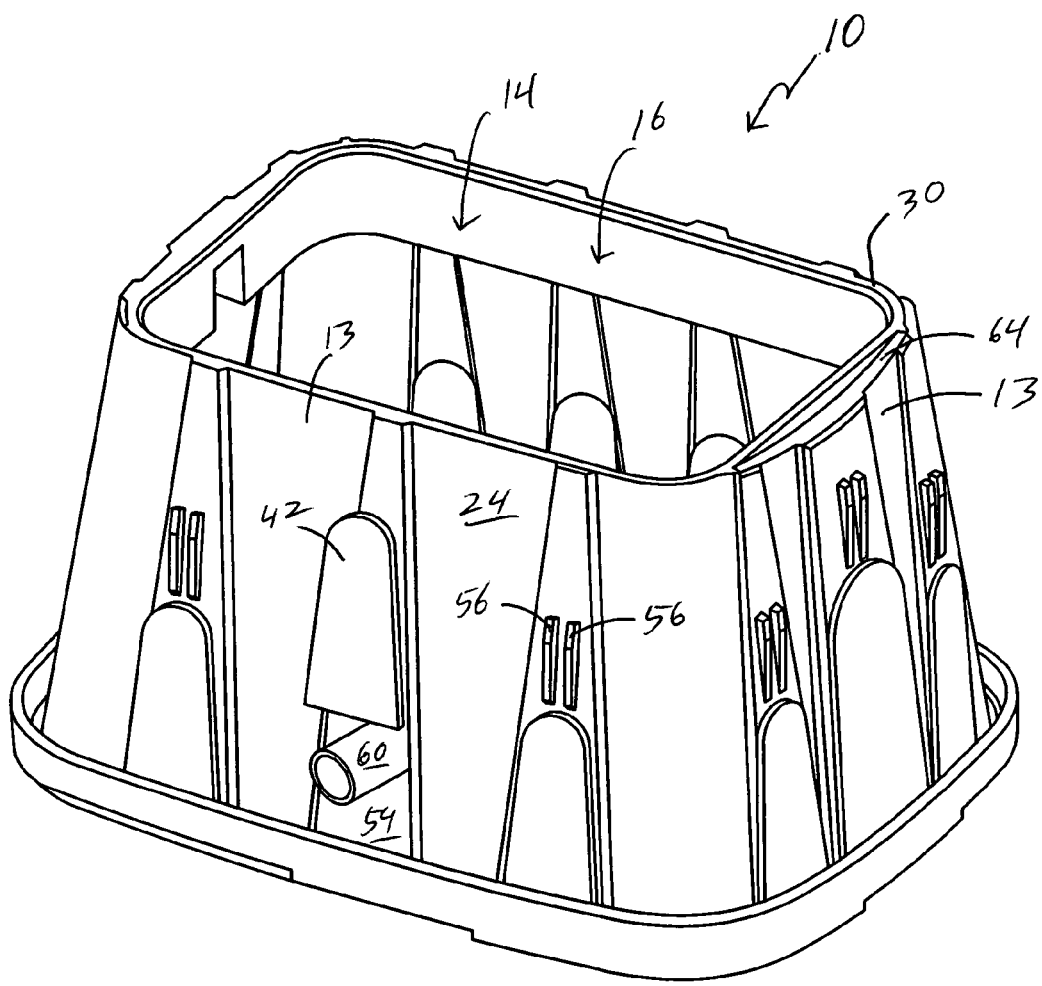
FIG. 12 is a perspective view the valve box of FIG. 1 with a removed knockout partially covering a valve box opening.
Figure 13:
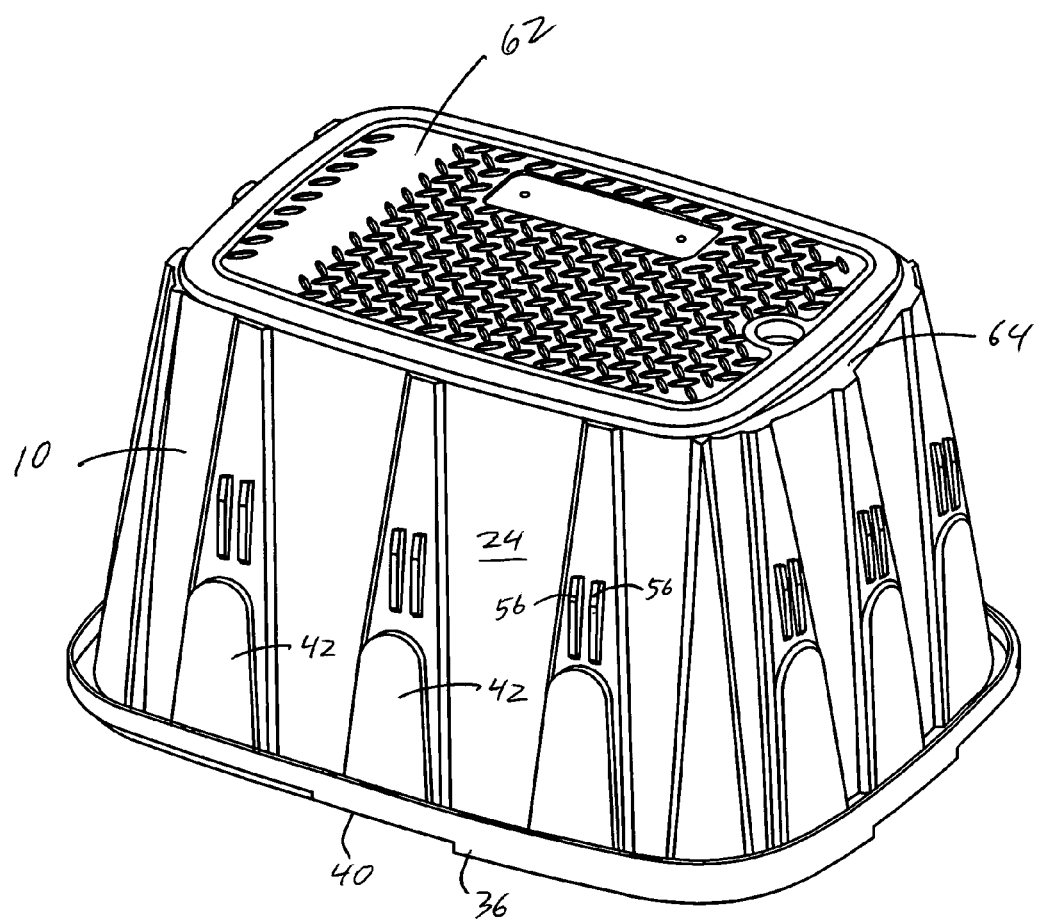
FIG. 13 is a perspective view the valve box of FIG. 1 with a lid covering the upper valve box opening.
Figure 14:
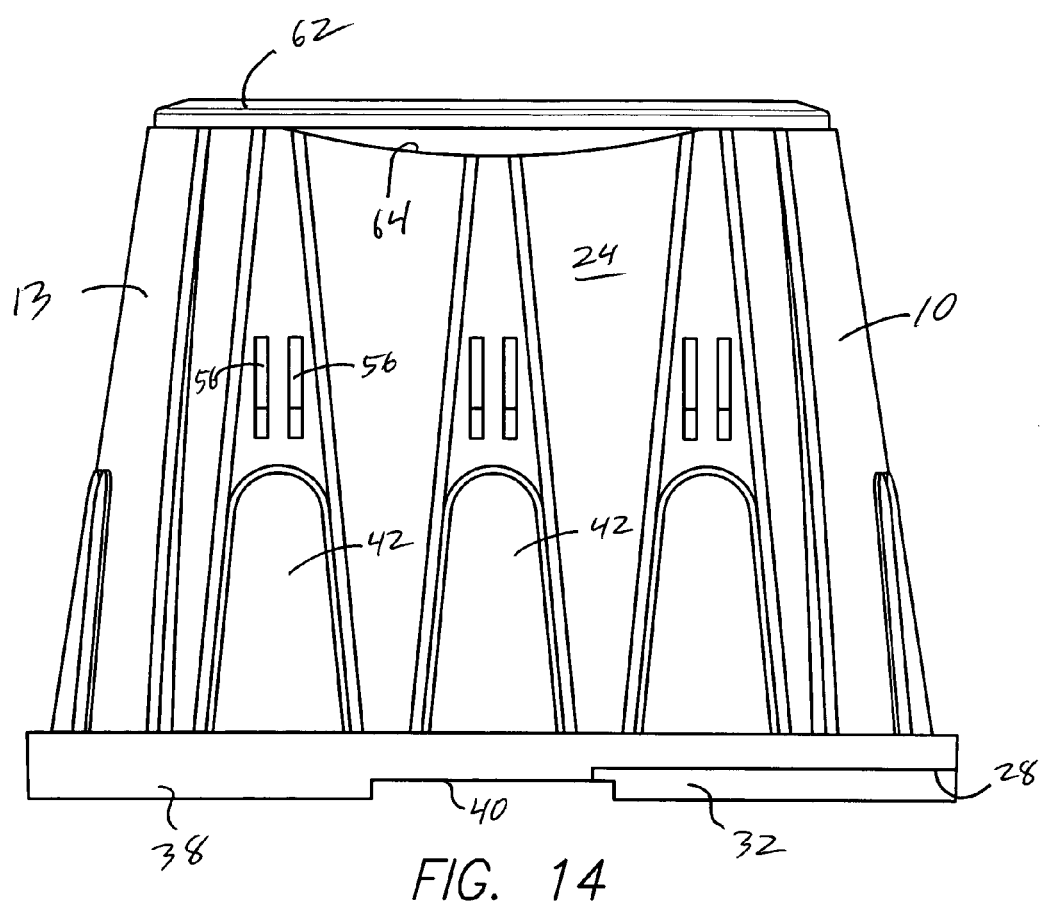
FIG. 14 is a front elevation view of the valve box of FIG. 1 with a lid covering the upper valve box opening.

Referring to FIGS. 10–12, adjacent to and disposed above each knockout 42 or knockout opening 54 is a wall coupler, which in the illustrated embodiment is a pair of vertically-oriented wall ribs 56. These ribs 56 are adapted to mate with the knockout coupler, i.e., the rib or extension 48 formed on the inner face 50 of each knockout 42, so that after the knockout 42 is removed from the housing wall 13, the knockout 42 can be removably connected to the wall ribs 56.

As best seen in FIG. 11, because the walls 13 are slanted inward toward the cavity 14, gravity inhibits the knockout 42 from falling outward away from the wall 13. Moreover, the pair of wall ribs 56 interlock with the knockout rib 48 thus inhibiting transverse removal of the knockout 42 from the wall 13. When the knockout 42 is so attached to the wall 13, the knockout 42 can rest on a conduit 60 extending through the knockout opening 54 and cover the portion of the opening of the opening 54 that is disposed above the conduit 60. This can inhibit the introduction of dirt into the interior cavity 14 of the housing 10 when the location in the ground in which the housing 10 is placed is being backfilled.

While the illustrated embodiment shows a wall coupler comprised of two parallel ribs 56 and a knockout coupler comprised of one rib 48, it will be appreciated that other coupler or connector arrangements may be used as well. For example, rather than having two ribs on the housing wall and one rib on the knockout, the arrangement can be reversed whereby there are two ribs on the knockout that are adapted to mate with one rib on the housing wall.

Also rather than relying on the inward slant of the entire housing wall, along with the force of gravity, to inhibit any outward movement of the knockout from the wall, the housing wall of an alternative embodiment can be vertically-oriented, but have a portion of the outer wall face that extends outwardly from the vertical wall and that provides a separate surface with an inward slant. In other words, such a wall can have a portion of the outer wall surface that defines an imaginary plane that slants inward toward the direction of interior cavity. The wall ribs can be disposed on this inward-slanting portion of the outer surface of the wall and thereby take advantage of gravity to inhibit any outward movement of the removed knockout away from the wall.

In yet alternative embodiments, other wall couplers and knockout couplers can be used, such as for example, clamps, dowels, fasteners, hooks, keys, bosses, detents, latches, openings, lugs, tabs, catches, flanges, pins, and screws.

The improved box further has a ledge located at the top of the box, just below its lid. This allows the lid to be removed with the use of a shovel or other tool or lever while minimizing the risk of damage to the box. The ledge guides the tip of the shovel under the lid so that the lid can be lifted open without having to dig out the dirt and debris from around the box by hand.

Figure 15:
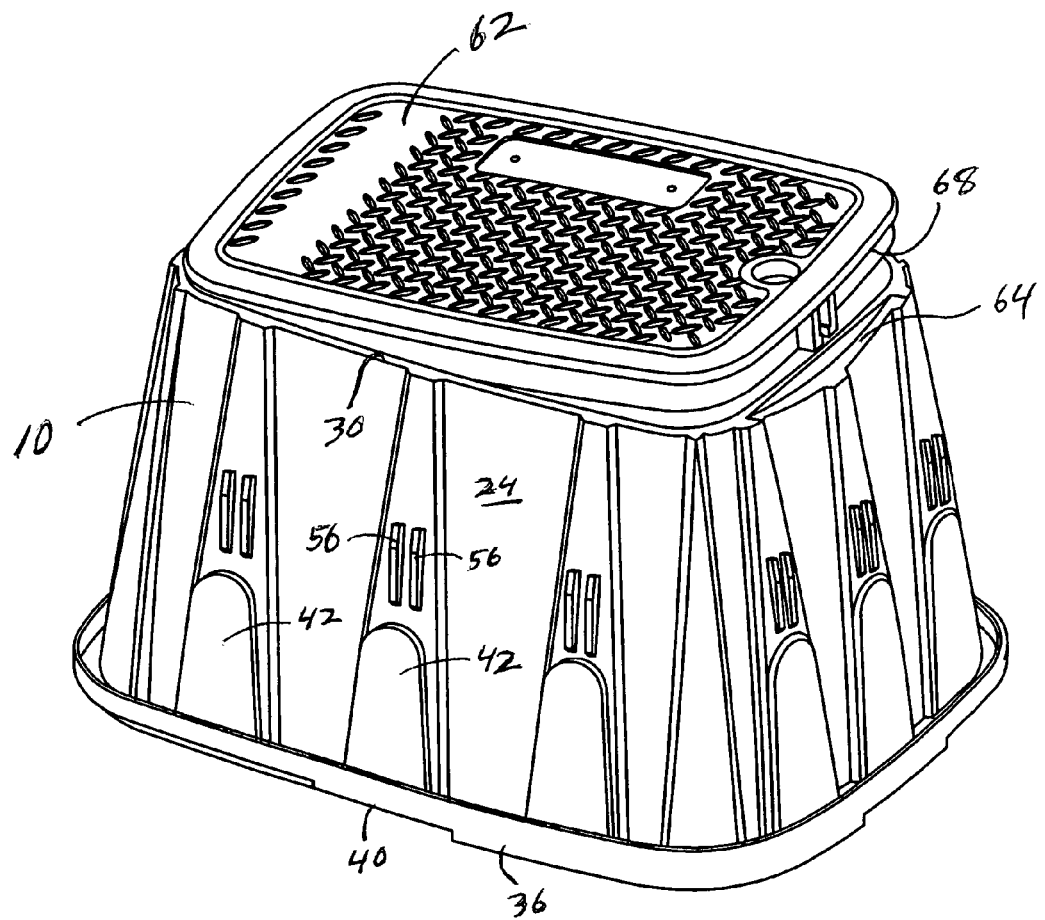
FIG. 15 is a perspective view the valve box of FIG. 1 with a lid partially removed from the upper valve box opening.
Figure 16:
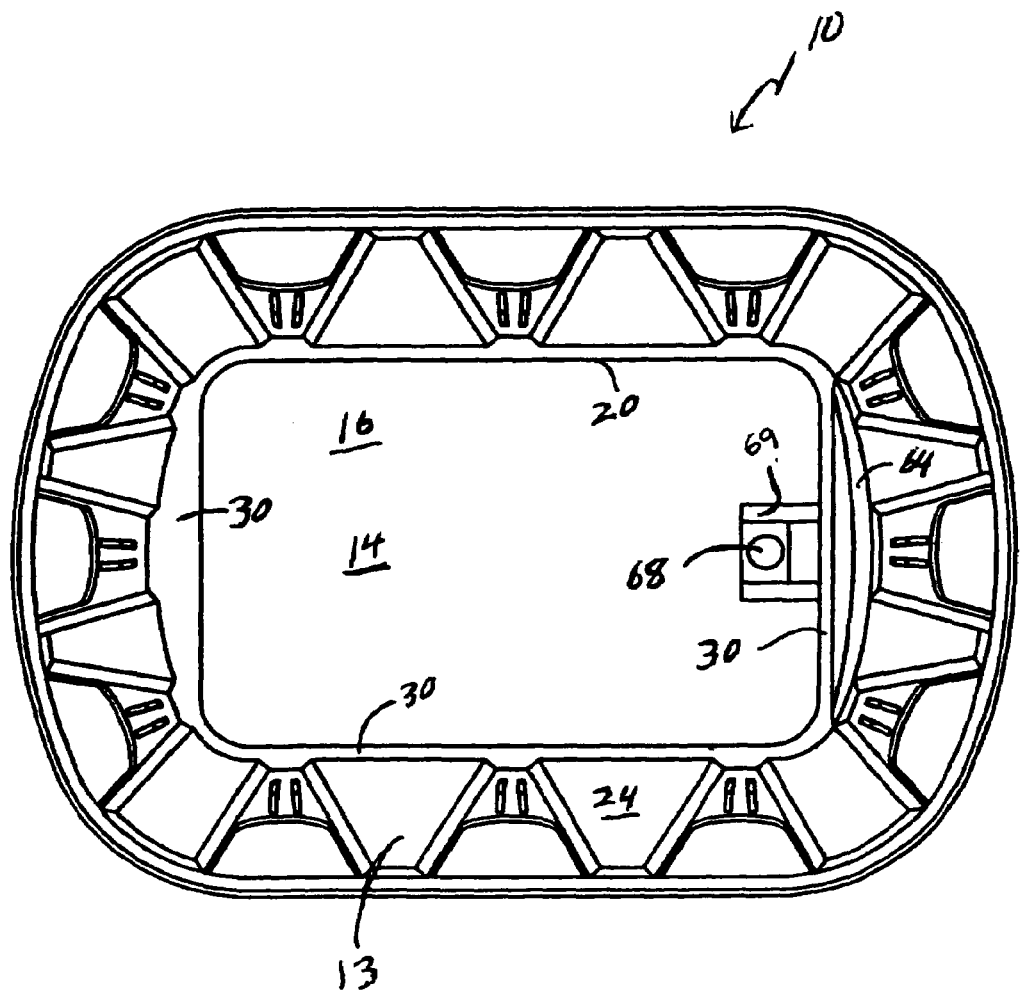
FIG. 16 is a top plan view of the valve box of FIG. 1.
Figure 17:
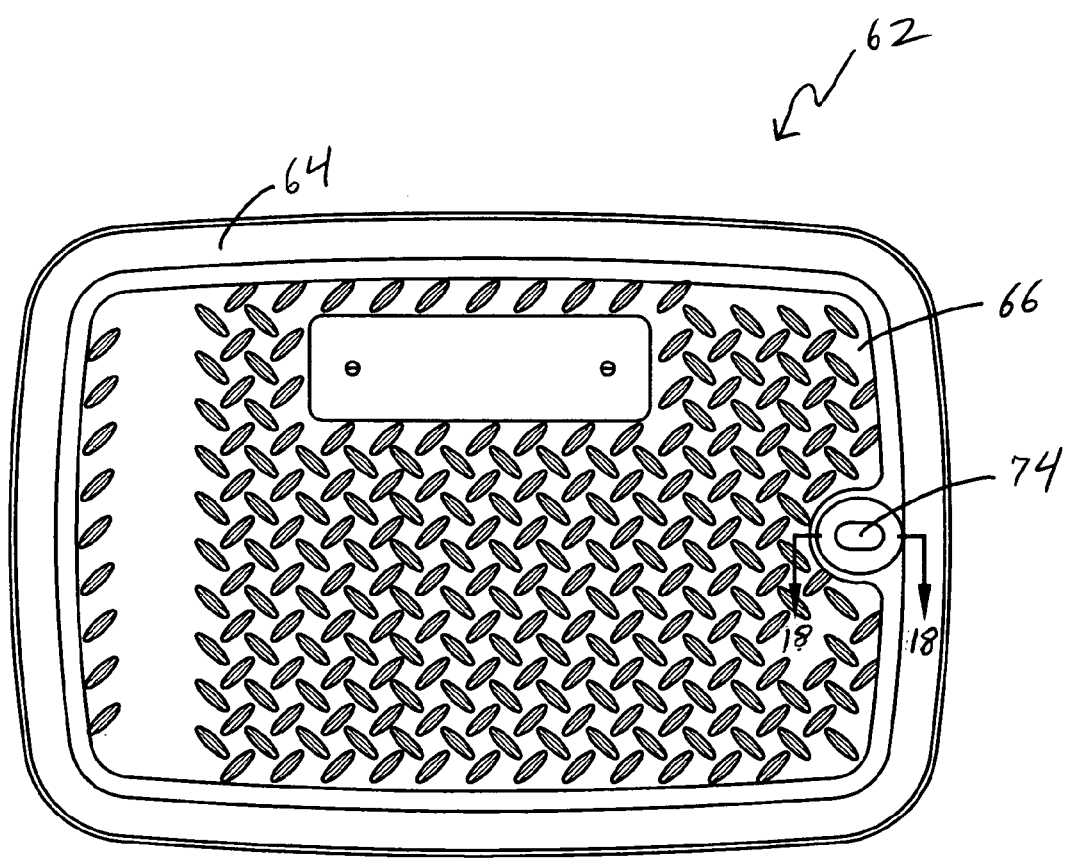
FIG. 17 is a top plan view of a valve box lid in accordance with one embodiment of the invention.

Referring now to FIGS. 12–15, the upper housing edge surfaces 30 are adapted to support a valve box lid 62 so that the lid 62 substantially covers the upper opening 16. On one housing wall 13, a ledge 64 is disposed adjacent to the upper edge surface 30 so that a portion of the lid 62 overhangs the ledge 64. The ledge 64 is adapted to permit the insertion of a lever, such as a shovel or other tool, between the overhanging portion of the lid 62 and the ledge 64 when the lid is supported by the housing edge. In the illustrated embodiment, the ledge 64 is curve-shaped and adapted to register with the blade of a shovel. Thus the ledge 64 is a fulcrum and provides the support for the shovel blade to lift a portion of the lid 62 off of the housing upper ledge surface 30 for easier removal of the lid as is best seen in FIG. 15.

In an alternative embodiment, a ledge is not used as the fulcrum. Rather, the upper housing edge surface itself has a recessed portion that defines a gap between the recessed portion and the lid. The gap is of sufficient size to permit the insertion of a lever between the lid and the recessed portion of the edge surface that provides the necessary support for the lever to lift the lid off of the housing edge surface.

In order to inhibit the entry into the box of dirt or insects, a lid knockout is provided in the lid. This knockout is a plug of plastic or other material that has a narrow groove around it that allows the knockout to be "punched out" by the user when he or she desires a hole for coupling the lid to the box. However if the user does not desire to use a bolt or other coupler to secure the lid to the box, then the lid knockout can remain in place, thereby helping to seal the interior box cavity.

Referring now to FIGS. 15–18, the lid 62 comprises a generally planar-shaped member 64 having an exterior side 66 and an interior side 68. The interior side 68 of the lid member 64 is adapted to abut the upper housing edge surface 30 so that the edge surface 30 supports the member 64 and so that the member 64 substantially covers the upper housing opening 16. A housing coupler is disposed adjacent to the upper housing edge surface 30 and is adapted to mate with a lid coupler for securing the lid 62 to the housing 10. In the illustrated embodiment, the housing coupler is comprised of a bracket 69 extending into the interior cavity 14 and having an internally-threaded bore 68. The lid coupler is a bolt adapted to mate with the bore 68.

Figure 18:
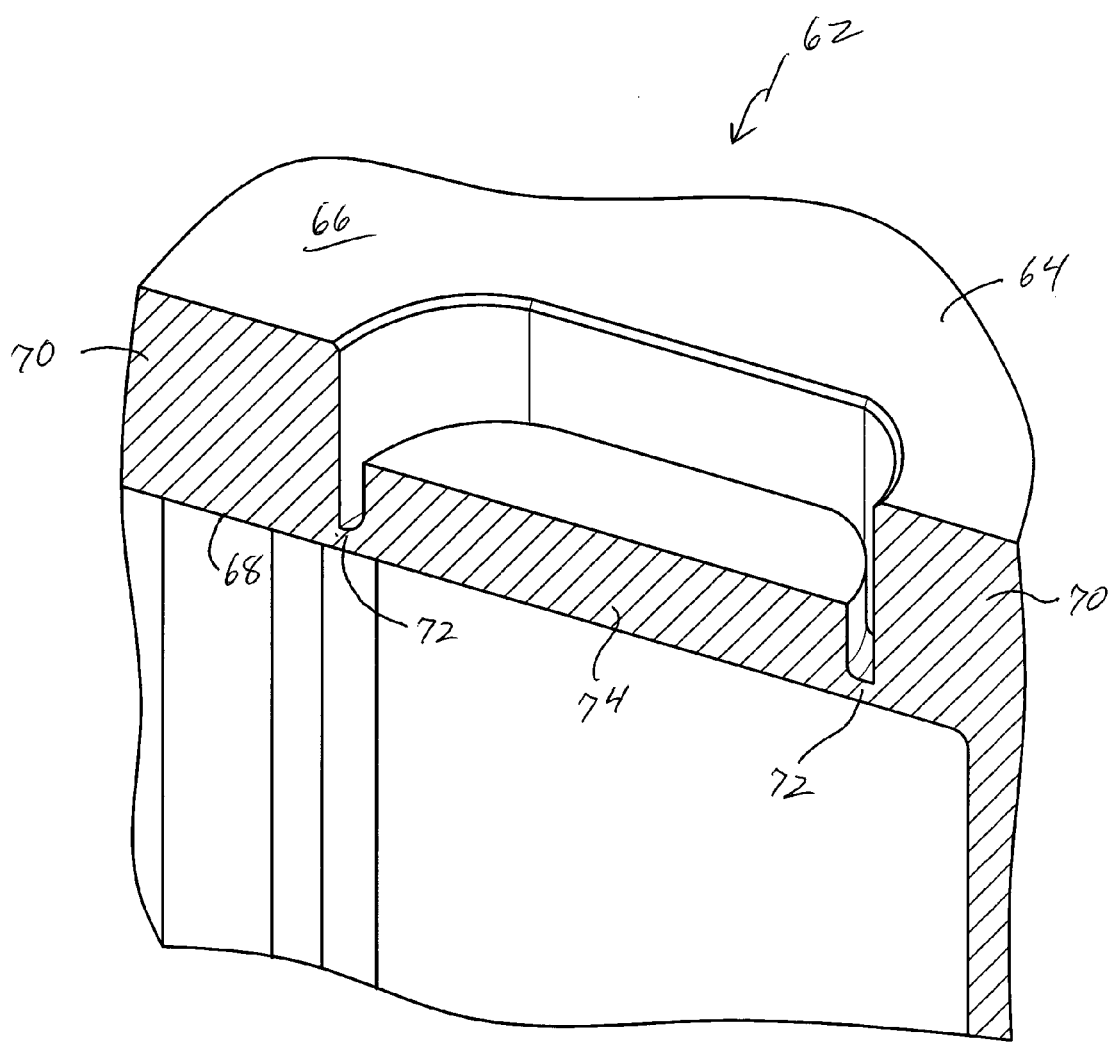
FIG. 18 is a cross-sectional view along lines 18—18 of FIG. 17 of a valve box lid knockout.

As best seen in FIG. 18, the planar-shaped member 64 includes a first portion 70 constructed of a material having a first thickness and a second portion 72 constructed of a material having a second thickness that is less than the first thickness. A lid knockout 74 or plug is formed in the planar-shaped member 64 and is recessed below the face of the exterior side 66 of the member 64. The lid knockout 74 is surrounded by the first and second member portions 70, 72, whereby the relatively thin second portion 72 is used to connect the knockout 74 to the first portion 70.

The lid knockout 74 is constructed of a material having a thickness that is greater than the thickness of the relatively thin second portion 72 of the member 64, but is less than the thickness of the first portion 70 of the member 64. These varying thicknesses of material allow the knockout 74 to be removed from the member 64 without excessive difficulty thereby providing a generally oval-shaped lid opening. The lid opening is positioned in the lid 62 to permit the bolt to extend through the lid opening and align for engagement with the internally threaded bore 68 of the housing bracket 69 thereby removably securing the lid 62 to the housing 10.

Alternative couplers, however, can include an externally-threaded stud or bolt that is mounted in the interior cavity and adapted to extend through the lid opening for engagement with an internally-threaded nut as the lid coupler. In addition to nut and bolt combinations, alternative housing and lid couplers can include clamps, dowels, fasteners, hooks, keys, bosses, latches, lugs, tabs, catches, flanges, pins, and screws.

Thus there is disclosed an improved underground box and lid that can be particularly useful as a protective enclosure for devices that are commonly connected to subterranean conduits, particularly water conduit systems, for example those employed in lawn and garden sprinkling systems and other irrigation systems. However, the present invention may be employed in any analogous field wherein a device is desired to be protected from its underground environment while at the same time to be accessible from above ground.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A housing for installation in the ground comprising:
   at least one wall forming an interior cavity;
   a first knockout formed in the at least one wall and adapted for removal from the at least one wall thereby forming a first opening into the interior cavity when the first knockout is removed;
   a first wall coupler disposed on the at least one wall; and
   a first knockout coupler disposed on the first knockout and adapted to connect the first knockout to the first wall coupler so that the first knockout at least partially covers the first opening;
   wherein the first wall coupler is comprised of a pair of wall ribs disposed adjacent to the first opening that is formed when the first knockout is removed from the at least one wall and wherein the first knockout coupler is comprised of a knockout rib adapted to mate with the pair of wall ribs.

2. The housing of claim 1 wherein each one of the pair of wall ribs has a vertical orientation and is disposed above the first opening.

3. A housing for installation in the ground comprising:
   at least one wall forming an interior cavity;
   a first knockout formed in the at least one wall and adapted for removal from the at least one wall thereby forming a first opening into the interior cavity when the first knockout is removed;
   a first wall coupler disposed on the at least one wall; and
   a first knockout coupler disposed on the first knockout and adapted to connect the first knockout to the first wall coupler so that the first knockout at least partially covers the first opening;
   wherein the first wall coupler is comprised of a wall rib disposed adjacent to the first opening that is formed when the first knockout is removed from the at least one wall and wherein the first knockout coupler is comprised of a pair of knockout ribs adapted to mate with the wall rib.

4. A housing for installation in the ground comprising:
   at least one wall forming an interior cavity;

a first knockout formed in the at least one wall and adapted for removal from the at least one wall thereby forming a first opening into the interior cavity when the first knockout is removed;

a first wall coupler disposed on the at least one wall;

a first knockout coupler disposed on the first knockout and adapted to connect the first knockout to the first wall coupler so that the first knockout at least partially covers the first opening;

a second knockout formed in the at least one wall and adapted for removal from the at least one wall thereby forming a second opening into the interior cavity when the second knockout is removed;

a third knockout formed in the at least one wall and adapted for removal from the at least one wall thereby forming a third opening into the interior cavity when the third knockout is removed;

a second wall coupler and a third wall coupler wherein each of said second and third wall couplers is disposed on the at least one wall;

a second knockout coupler disposed on the second knockout and adapted to connect the second knockout to the second wall coupler so that the second knockout at least partially covers the second opening; and a third knockout coupler disposed on the third knockout and adapted to connect the third knockout to the third wall coupler so that the third knockout at least partially covers the third opening;

wherein the first, second and third wall couplers are each comprised of a pair of wall ribs disposed adjacent to the first, second and third opening, respectively, that is formed when the first, second and third knockout, respectively, is removed from the at least one wall, and wherein the first, second and third knockout couplers are each comprised of a knockout rib adapted to mate with the pair of wall ribs adjacent to the first, second and third opening, respectively.

5. A housing for installation in the ground comprising:

at least one wall forming an interior cavity;

a first knockout formed in the at least one wall and adapted for removal from the at least one wall thereby forming a first opening into the interior cavity when the first knockout is removed;

a first wall coupler disposed on the at least one wall;

a first knockout coupler disposed on the first knockout and adapted to connect the first knockout to the first wall coupler so that the first knockout at least partially covers the first opening;

a second knockout formed in the at least one wall and adapted for removal from the at least one wall thereby forming a second opening into the interior cavity when the second knockout is removed;

a third knockout formed in the at least one wall and adapted for removal from the at least one wall thereby forming a third opening into the interior cavity when the third knockout is removed;

a second wall coupler and a third wall coupler wherein each of said second and third wall couplers is disposed on the at least one wall;

a second knockout coupler disposed on the second knockout arid adapted to connect the second knockout to the second wall coupler so that the second knockout at least partially covers the second opening; and a third knockout coupler disposed on the third knockout and adapted to connect the third knockout to the third wall coupler so that the third knockout at least partially covers the third opening;

wherein the first, second and third wall couplers are each comprised of a wall rib disposed adjacent to the first, second and third opening, respectively, that is formed when the first, second and third knockout, respectively, is removed from the at least one wall, and wherein the first, second and third knockout couplers are each comprised of a pair of knockout ribs adapted to mate with the wall rib adjacent to the first, second and third opening, respectively.

6. A housing for installation in the ground comprising:

at least one wall forming an interior cavity and having an inner surface and an outer surface wherein at least a portion of the outer surface defines an imaginary plane that slants inward toward the direction of interior cavity;

a knockout formed in the at least one wall and adapted for removal from the at least one wall thereby forming an opening into the interior cavity when the knockout is removed;

a plurality of vertically oriented wall ribs disposed on the portion of the outer surface of the at least one wall; and at least one knockout rib disposed on the knockout and adapted to connect the knockout to the plurality of wall ribs so that the knockout at least partially covers the opening.

7. A housing for installation in the ground comprising:

at least one wall forming an interior cavity and forming an upper opening into the interior cavity and a lower opening into the interior cavity, said upper opening having an upper opening perimeter and said lower opening having a lower opening perimeter;

wherein the at least one wall is slanted so that the upper opening perimeter is smaller than the lower opening perimeter;

a knockout formed in the at least one wall and adapted for removal from the at least one wall thereby forming a knockout opening into the interior cavity when the knockout is removed;

a plurality of vertically oriented wall ribs disposed on the outer surface of the at least one wall; and at least one knockout rib disposed on the knockout and adapted to connect the knockout to the plurality of wall ribs so that the knockout at least partially covers the knockout opening.

* * * * *